United States Patent
Walrant

(10) Patent No.: US 10,789,364 B2
(45) Date of Patent: Sep. 29, 2020

(54) METHOD FOR PROVIDING AN AUTHENTICATED UPDATE IN A DISTRIBUTED NETWORK

(71) Applicant: NXP B.V., Eindhoven (NL)

(72) Inventor: Thierry G. C. Walrant, Bouge (BE)

(73) Assignee: NXP B.V., Eindhoven (NL)

( * ) Notice: Subject to any disclaimer, the term of this patent is extended or adjusted under 35 U.S.C. 154(b) by 407 days.

(21) Appl. No.: 15/969,307

(22) Filed: May 2, 2018

(65) Prior Publication Data
US 2019/0340363 A1 Nov. 7, 2019

(51) Int. Cl.
H04L 29/06 (2006.01)
G06F 21/57 (2013.01)
H04L 9/32 (2006.01)
H04L 12/40 (2006.01)

(52) U.S. Cl.
CPC .......... *G06F 21/572* (2013.01); *H04L 9/3234* (2013.01); *H04L 9/3242* (2013.01); *H04L 12/40* (2013.01); *H04L 63/0263* (2013.01); *H04L 63/083* (2013.01); *H04L 2012/40215* (2013.01)

(58) Field of Classification Search
CPC ... G06F 21/572; H04L 9/3234; H04L 9/3242; H04L 12/40; H04L 63/0263; H04L 63/083; H04L 2012/40215
See application file for complete search history.

(56) References Cited

U.S. PATENT DOCUMENTS

| 8,429,311 | B2 * | 4/2013 | Koenigseder | H04L 12/40 710/11 |
|---|---|---|---|---|
| 10,360,367 | B1 * | 7/2019 | Mossoba | G06F 21/31 |
| 2003/0191943 | A1 | 10/2003 | Poisner et al. | |
| 2015/0195364 | A1 | 7/2015 | Petersen et al. | |

(Continued)

FOREIGN PATENT DOCUMENTS

EP 17182764.5 7/2017

OTHER PUBLICATIONS

Coombs, Rob, "GlobalPlatform based Trusted Execution Environment and TrustZone Ready—The foundations for trusted services;" White Paper ARM, Oct. 31, 2013; retrieved from the internet at http://community.arm.com/servlet/JiveServlet/previewBody/8376-102-1-14233/GlobalPlatform based Trusted Execution Environment and TrustZone Ready—Whitepaper.pdf on Jun. 12, 2015.

(Continued)

*Primary Examiner* — Ghodrat Jamshidi
(74) *Attorney, Agent, or Firm* — Daniel D. Hill

(57) ABSTRACT

A method for providing an authenticated update in a distributed network is provided. The distributed network has a plurality of nodes coupled to a serial bus. The method begins with transmitting a credential from an external device to a first node. The update data and an authentication code are provided to a processor of a second node from the external device. The processor of the second node provides the update data and the authentication code to the transceiver of the second node. The authenticated update is finalized by the processor of the second node. The authenticated update is closed by the transceiver of the first node. The credential of the authenticated update is provided to the transceiver of the second node. The transceiver of the second node verifies the update data using the credential and the authentication code. After being verified, the authenticated update data is stored.

18 Claims, 4 Drawing Sheets

(56) References Cited

U.S. PATENT DOCUMENTS

| | | | |
|---|---|---|---|
| 2016/0013934 A1 | 1/2016 | Smereka et al. | |
| 2016/0191408 A1* | 6/2016 | Yajima | H04L 12/4641 |
| | | | 709/225 |
| 2016/0255065 A1* | 9/2016 | Oshida | H04L 9/3242 |
| | | | 726/3 |
| 2016/0269231 A1* | 9/2016 | Bahr | H04L 12/2807 |
| 2016/0344555 A1 | 11/2016 | Elend | |
| 2017/0072875 A1* | 3/2017 | Kim | H04H 20/12 |
| 2017/0093659 A1 | 3/2017 | Elend et al. | |
| 2017/0093866 A1 | 3/2017 | Ben-Noon et al. | |
| 2018/0227128 A1* | 8/2018 | Church | H04L 63/0853 |
| 2018/0234248 A1* | 8/2018 | Imamoto | H04W 12/1006 |
| 2018/0374286 A1* | 12/2018 | Kim | H04L 43/50 |
| 2019/0028267 A1* | 1/2019 | Takemori | H04L 9/0866 |
| 2019/0288849 A1* | 9/2019 | Ma | H04L 12/40 |

OTHER PUBLICATIONS

Szilagyi, Chris, et al.; "A Flexible Approach to Embedded Network Multicast Authentication" Institute for Software Research, School of Computer Science; Research Showcase at Carnegie Mellon University, 2008.

* cited by examiner

METHOD FOR PROVIDING AN AUTHENTICATED UPDATE IN A DISTRIBUTED NETWORK

BACKGROUND

Field

This disclosure relates generally to security, and more specifically to a method for providing an authenticated update in a distributed network.

Related Art

The controller area network (CAN) is a communication standard that is used primarily for automotive applications. The data link layer of the CAN protocol is standardized as International Standards Organization (ISO) 11898. The CAN system provides serial communication between processors, sensors and actuators in a distributed network system for the control of systems such as airbags, brakes, cruise control, power steering, windows, door locks, engine control modules (ECM), electronic control units (ECU), etc. When CAN was first developed, there was no need to consider security because there was no provision for external access. However, the CAN system is now remotely, or externally, accessible by, for example, on-board diagnostics (OBD) systems for configuration and reporting regarding a vehicle's electronics. The exposure of a vehicle's systems to external entities creates security and safety risks.

In security domains and applications, authentication and integrity verification are two mechanisms used to protect a system from security threats such as spoofing and tampering. The data authentication and integrity verification are traditionally implemented with the help of cryptography algorithms and associated secret or public key(s). However, the use of cryptographic algorithms generally requires the extensive use of processing time and non-volatile storage. In contrast, non-cryptographic countermeasures are also known and work well if the manufacturer accepts that these rules can be only programmed once, without incurring the high costs of relying on real-time cryptographic countermeasures. The use of non-cryptographic countermeasures, in order to counteract potential rogue attacks, have started to be developed for CAN transceivers operational on a CAN bus. To protect the system, secure CAN transceivers may provide for message killing on the CAN bus in accordance with a rule set, filtering message transmissions, and limiting a rate of message transmission.

The rules sets of the secure transceivers may require device configuration updates from time-to-time. The device configuration update on a CAN may require authentication of the new rules set data when it includes and relates to secure assets such as firewall rules. For security purposes, the correct rules need to be applied to protect against unauthorized modifications, necessitating the need for a secure way to update the rules.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

DETAILED DESCRIPTION

Figure 1:
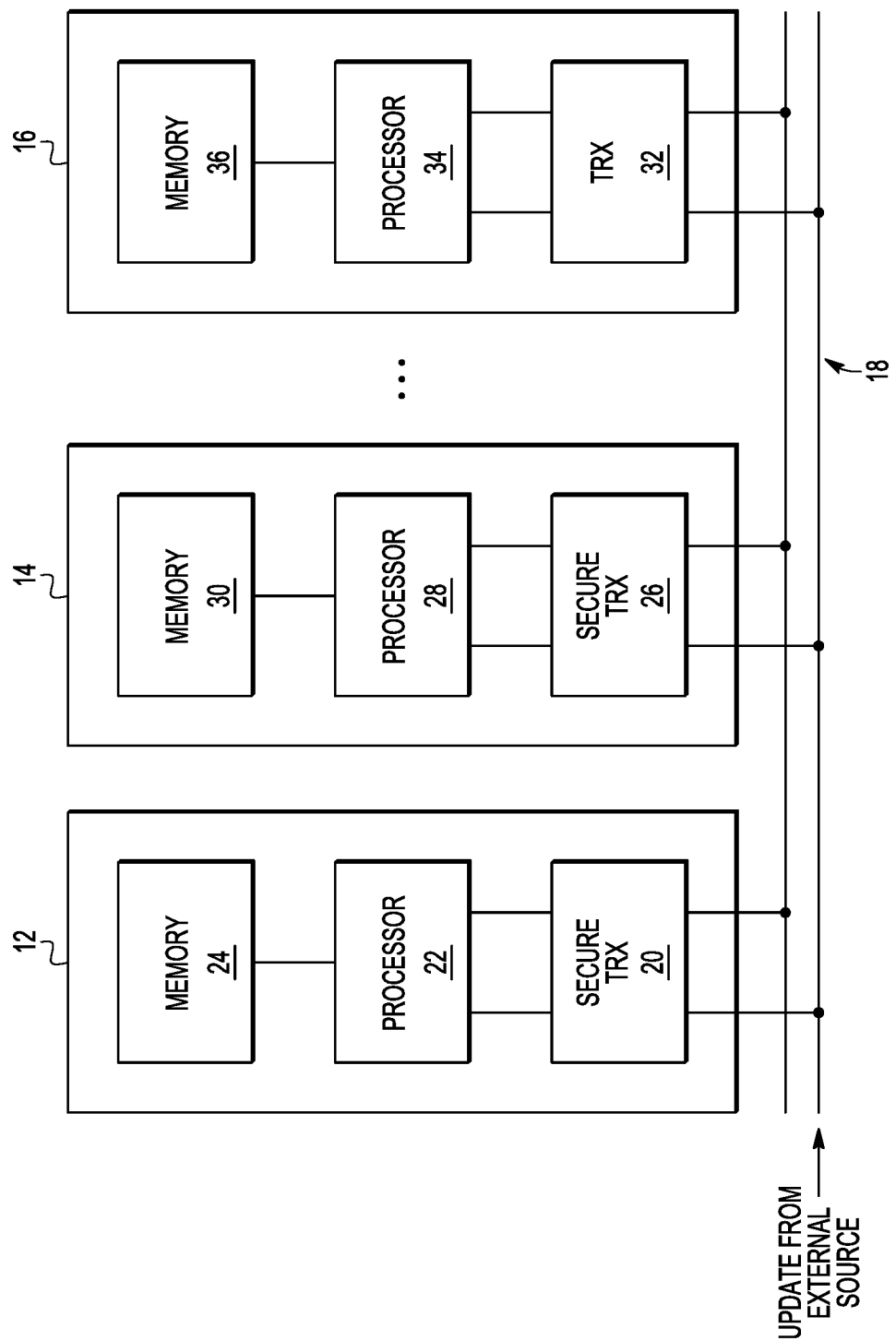
FIG. 1 illustrates a distributed network system in accordance with an embodiment.

Generally, there is provided, a method for updating a rules set for a secure transceiver that does not require the use of complex cryptography. A trusted node in a CAN system is given responsibility for authenticating an update of the rules set for another node in the system. An authentication code is not known or stored by the trusted node prior to the update. The node having the rules updated performs a two-step authentication using the authentication code and the credential. The first step stores new data plus the authentication code for the update in memory on the secure transceiver of the node being updated. The second step performs the authentication using the authentication code and stores the new data in NVM in the secure transceiver. The data cannot be modified during the second step. The authentication is verified using a credential provided by the trusted node. The credential is provided by the trusted node only during the execution of the second step. The trusted node is the only node able to provide the credential. The use of a trusted node to verify the authenticated update requires an attacker, or a rogue node, to compromise two nodes instead of just one. Also, the method provides for an authentication of the update without the use of complex cryptography.

In accordance with an embodiment, there is provided, a method for providing an authenticated update in a distributed network having a plurality of nodes coupled to a serial bus, the method including: transmitting a credential from an external source to a first node; providing update data and an authentication code to a second node from the external source; initiating the authenticated update by a processor of the second node; finalizing the authenticated update by the processor of the second node; closing the authenticated update by the first node; providing, by the first node, the credential of the authenticated update to the second node; verifying the update data using the credential and the authentication code; and storing the authenticated update data. The transceiver of the first node may be characterized as being a secure transceiver capable of invalidating messages on the serial bus according to predetermined rules. The step of verifying further includes using a cyclic redundancy check over a scrambled version of the update data and the authentication code according to a scramble mask defined by the credential. The authenticated update may be an update of a set of rules for a predetermined transceiver of the distributed network. Initiating the authenticated update may further include a transceiver of the second node entering an update state wherein the transceiver of the second node accepts commands to update data in a memory of the transceiver of the second node and rejects commands to set the credential. Finalizing the authenticated update may further include a transceiver of the second node entering a close state wherein the transceiver of the second node does not accept commands to update data in a memory of the second node. The distributed network may be a controller area network (CAN). The authentication code may be characterized as being a message authentication code (MAC). The credential may be randomly generated for each authenticated update in the distributed network.

In another embodiment, there is provided, a method for providing an authenticated update in a distributed network having a plurality of nodes coupled to a serial bus, the method including: transmitting a credential from an external device to the first node; providing update data and an authentication code to a processor of a second node from the external device; initiating the authenticated update by the processor of the second node; providing, by the processor of the second node, the update data and the authentication code to a secure transceiver of the second node; finalizing the authenticated update by the processor of the second node; closing the authenticated update by the first node; providing, by a transceiver of the first node, the credential of the authenticated update to the secure transceiver of the second node, wherein the transceiver of the first node is configured to monitor and invalidate messages on the serial bus according to predetermined rules; verifying, by the secure transceiver of the second node, the update data using the credential and the authentication code; and storing the authenticated update data in a memory. Verifying further includes using a cyclic redundancy check over a scrambled version of the update data and the authentication code according to a scramble mask defined by the credential. The credential may be a password. The authenticated update may be an update of a set of rules for a predetermined secure transceiver of the distributed network. Initiating the authenticated update may further include a transceiver of the second node entering an update state wherein the transceiver of the second node accepts commands to update data in a memory of the transceiver of the second node and rejects commands to set the credential. Initializing the authenticated update may further include the secure transceiver of the second node entering a close state wherein the secure transceiver of the second node does not accept commands to update data in a memory of the second node.

In yet another embodiment, there is provided, a method for providing an authenticated update in a distributed network having a plurality of nodes coupled to a serial bus, the method including: transmitting a credential from an external device to a secure transceiver of the first node; providing update data and an authentication code to a processor of a second node from the external device; initiating the authenticated update by the processor of the second node; entering an update state; providing, by the processor of the second node, the update data and the authentication code to the secure transceiver of the second node; finalizing the authenticated update by the processor of the second node; entering a close state; closing the authenticated update by the secure transceiver of the first node; providing, by the transceiver of the first node, the credential of the authenticated update to the secure transceiver of the second node; verifying, by the secure transceiver of the second node, the update data using the credential and the authentication code; and storing the authenticated update data in a memory. The distributed network may be a controller area network (CAN). The authentication code may be characterized as being a message authentication code (MAC). The secure transceiver may be characterized as being capable of removing messages on the serial bus according to predetermined rules. The authenticated update may be an update of the predetermined rules.

FIG. 1 illustrates a distributed network system 10 in accordance with an embodiment. In one embodiment, distributed network system 10 is a CAN system. The CAN was originally developed for use in automobiles. However, CAN systems are also used in other technology areas, such as industrial automation, medical equipment, aerospace, and railway systems. System 10 includes a plurality of nodes, represented by nodes 12, 14, and 16 connected to serial bus 18. Serial bus 18 includes only two conductors for broadcasting differentials signal to the plurality of nodes. Each node is allowed to broadcast messages, in the form of frames, one bit at a time on serial bus 18. In one embodiment, serial bus 18 is a CAN bus.

Various types of nodes can be connected to a CAN bus depending on the applications. The nodes in FIG. 1 have been simplified for ease of illustration. Node 12 is just one type of device and includes secure transceiver 20, processor 22, and memory 24. Node 14 includes secure transceiver 26, processor 28, and memory 30. Node 16 includes transceiver 32, processor 34, and memory 36. Note that all of the transceivers do not have to be secure transceivers. In node 12, secure transceiver 20, processor 22, and memory 24 may be implemented together on one integrated circuit or as multiple integrated circuits. Processor 22 may be implemented as a microprocessor (MPU), microcontroller (MCU), digital signal processor (DSP), or the like. In one embodiment, processor 22 functions as a microcontroller having CAN controller functionality for controlling the CAN functions of device 12. Memory 24 is connected to processor 22 and may be implemented as one or more volatile and non-volatile memories for storing, for example, control information, messages, and data. In one embodiment, memory 24 does not includes secure storage. Secure transceiver 20 may be a CAN transceiver connected to processor 22 and to serial bus 18. The CAN controller integrated into processor 22 broadcasts and receives messages serially from CAN serial bus 18. Secure transceiver 20 is characterized as being secure because it is capable of, for example, filtering and removing messages on serial bus 18 according to predetermined rules. Secure transceiver 20 provides security against intrusions without the use of complex cryptography. In the illustrated embodiment, secure transceiver 20 does not include a secure element or a secure memory. In other embodiments, secure transceiver 20 may include different security related functionality. In FIG. 1, node 14 is similar to node 12 and includes a secure transceiver 26. Node 16 has a transceiver 32 that lacks secure functionality.

A rules set for controlling the security functions of secure transceiver 26 is stored in non-volatile memory of each of secure transceivers 20 and 26. The rules sets may need to be updated from time-to-time. Therefore, a secure update mechanism is needed that does not allow unauthorized modifications. The use of cryptography to protect the update mechanism may not be acceptable or possible in a system because of constraints such as bandwidth limitations, absence of processing capability, and lack of sufficiently secure memory to store a key. The illustrated and described embodiment overcomes the need for complex cryptography to protect against unauthorized modifications to the rules sets during a rules update. This is accomplished using an update process that operates in two steps in collaboration with a trusted node. As an example, assume a rule set for use by secure transceiver 26 of node 14 is to be updated, and node 12 has been selected, or assigned, to be the trusted node. A trusted node is used because processor 28 of node 14 is not trusted and may be compromised. The first step of the update process acquires the update data in a memory, such as volatile storage in memory 44. Included with the new update data is an authentication code. In one embodiment, the authentication code may be all or part of a message authentication code (MAC). The update data may be provided from a source external to system 10 as illustrated in FIG. 1. In one embodiment, the external source may access system 10 via an onboard diagnostics (OBD) port (not shown) in an automobile, or via an original equipment manufacturer (OEM) diagnostics unit. The second step of the process performs an authentication based on a credential received from trusted node 12. The credential was provided directly to trusted node 12 by the external source. The credential is used to verify the authentication code. In one embodiment, the credential is a secret password. When the update has been successfully verified, the new update data is saved in a NVM in memory 44 of node 14. The credential is not permanently stored or persistent over multiple update sessions. The second step starts only after the first step is finalized. The credential is only used during the second step for authentication. The trusted node provides the required credential for use by the update mechanism only after the first step has been finalized. Only the trusted node can send the credential. The update mechanism does not allow the new update data or the authentication code to be modified during the second step. After the update, the credential will not be used again and will be considered invalid. Note that an additional security procedure is needed to confirm the identity of the trusted node. Any mechanism that can identify and authenticate the trusted node may be used.

Figure 2:
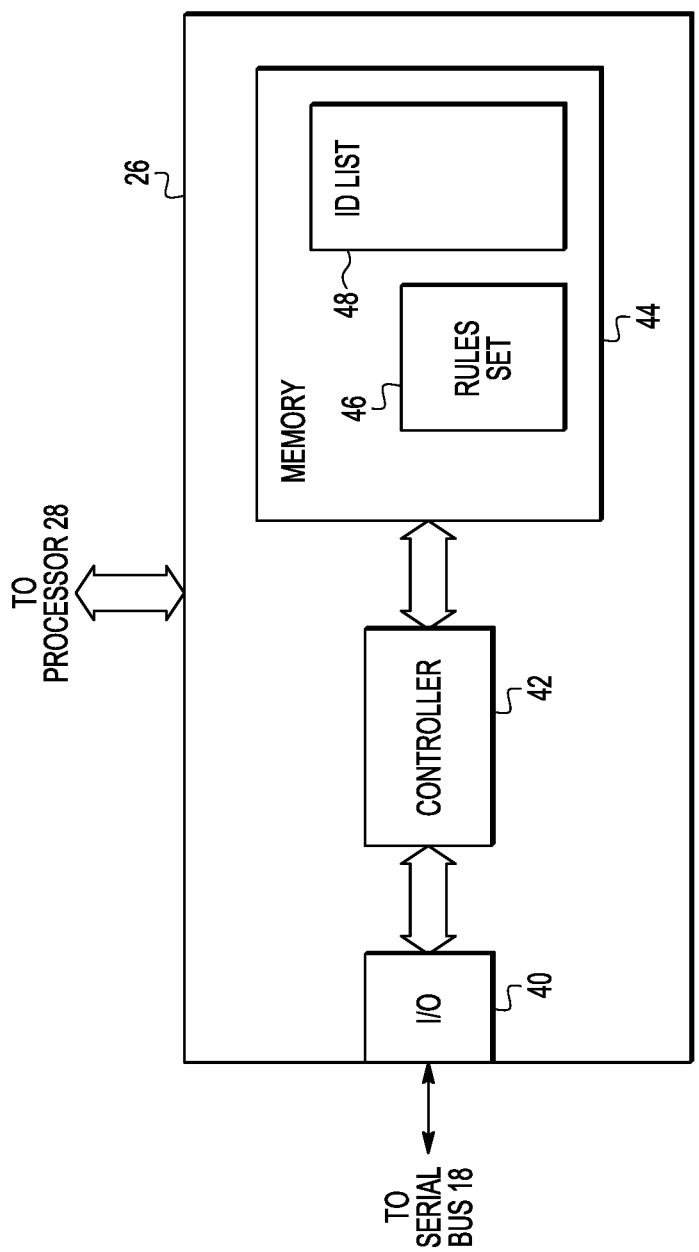
FIG. 2 illustrates a block diagram of a secure transceiver in accordance with an embodiment.

FIG. 2 illustrates a block diagram of the CAN secure transceiver 26 of node 14 in accordance with an embodiment. The use of secure transceiver 20 allows node 12 to function as a trusted node for a rules update of node 14 in accordance with the illustrated embodiment. CAN secure transceiver 26 includes input/output (I/O) port 40, controller 42, and memory 44. Memory 44 includes memory location 46 for storing a rules set and memory location 48 includes an ID list. Port 40 connects node 14 to bus 18. Secure transceiver 20 is provided with the ability to distinguish identifiers (ID) from messages broadcast on serial bus 18 as is typical of a CAN system. However, in addition to the typical use, an ID of node 12 distinguishes node 12 as being privileged to authenticate the update. In addition, secure transceiver 20 is configured to determine whether node 14 is allowed to receive an incoming message from bus 18 for the purpose of performing the update. Controller 42 provides transceiver 26 with the ability to receive and process CAN messages that are addressed to node 14 itself (or addressed to the CAN transceiver 26). The transceiver 26 of node 14 is not allowed to receive the incoming message to perform the update unless the message is from node 12. Otherwise secure transceiver 20 invalidates the message so that no transceiver receives the message. In some embodiments, transceiver 20 may cause the error message to be broadcast on bus 18, for example before the message end, such that an error message published on bus 18 identifies a presence of a rogue node to the other nodes, including nodes 14 and 16.

An ID for node 14 is stored in memory 44 that is only for the use of node 12. No other node except for the assigned privileged node 12 can send messages with the unique ID, by means of, for example, a transmission invalidation. Node 14 and other nodes with secure transceivers may also have unique IDs. Also, in some examples, trusted node 12 is configured to monitor the bus 18 to determine if the ID to be protected is being misused by a rogue device, and invalidate those messages if such a determination is made. Such message invalidating even prevents the easiest of physical attacks, such as attaching a dongle to the on-board diagnostics (OBD) port.

Figure 3:
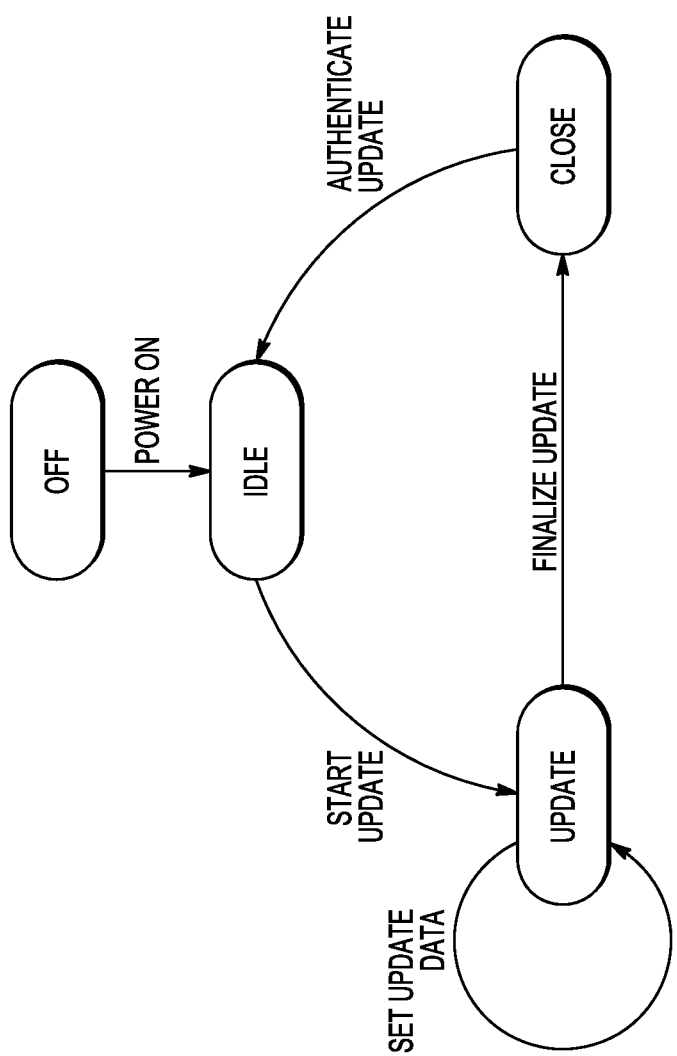
FIG. 3 illustrates a state diagram for state transitions during an authenticated update in accordance with an embodiment.

FIG. 3 illustrates a state diagram for state transitions during an authenticated update in accordance with an embodiment. An UPDATE state and a CLOSE state support the authenticated update. An OFF state is shown for completeness. An IDLE state is included to separate the update process from a non-update process, but is not required. In another embodiment, the IDLE state may provide support for an additional security measure that includes another trusted node or entity, where the start of the update is controlled by the other trusted entity. In FIG. 3, during the IDLE state, a command is issued to start the update process. Another implementation may have only two states, an UPDATE state and a CLOSE state, where a default may be to enter the update state at power up. To begin an authenticated update of a rules set, the UPDATE state accepts commands to update the data in a memory of the node being updated and the authentication code. The UPDATE state handles the first step of the authenticated update process. The authentication code associated with the update data is received by the node being updated at the same time as the update data. While in the UPDATE state, the transceiver is prevented from accepting any command to acquire the credentials used to verify the data with the authentication code.

The CLOSE state controls the second step of the update process. The first step (UPDATE state) is finalized before beginning the second step (CLOSE state). During the CLOSE state, a command to authenticate and commit the update data to permanent storage (memory 44 in FIG. 2) is issued. While in the CLOSE state, the node being updated cannot accept any command to update the data or the authentication code. The mechanism used to authenticate and check the integrity of the new update data during CLOSE state may be any suitable mechanism. For example, a simple CRC (cyclic redundancy check) over a scrambled version of the new update data and the authentication code according to a scramble mask defined by the credential information may be used. Also, a mechanism based on lightweight cryptography, for example, PRINCE is another possible solution to authenticate the new update data. The number of logic gates to support a PRINCE embodiment is small and the key would not be stored in the device. The key may be the credential information provided by a trusted node.

The update mechanism is rendered secure, or authenticated, because the new update data and the information to authenticate the new data are handled in two distinct states by two distinct entities and the credential can only be provided by the trusted and privileged node after indication of a transition to UPDATE state. In this manner, an attacker (or rogue processor in the system) does not know the credential before the second step (CLOSE state) and cannot modify the new update data outside of the first step (UPDATE state). Assuming proper protection of the assigned trusted node, an attacker must control at least two nodes to bypass the authenticated update mechanism. The node providing the new update data and the authentication code, and the node closing the update.

Figure 4:
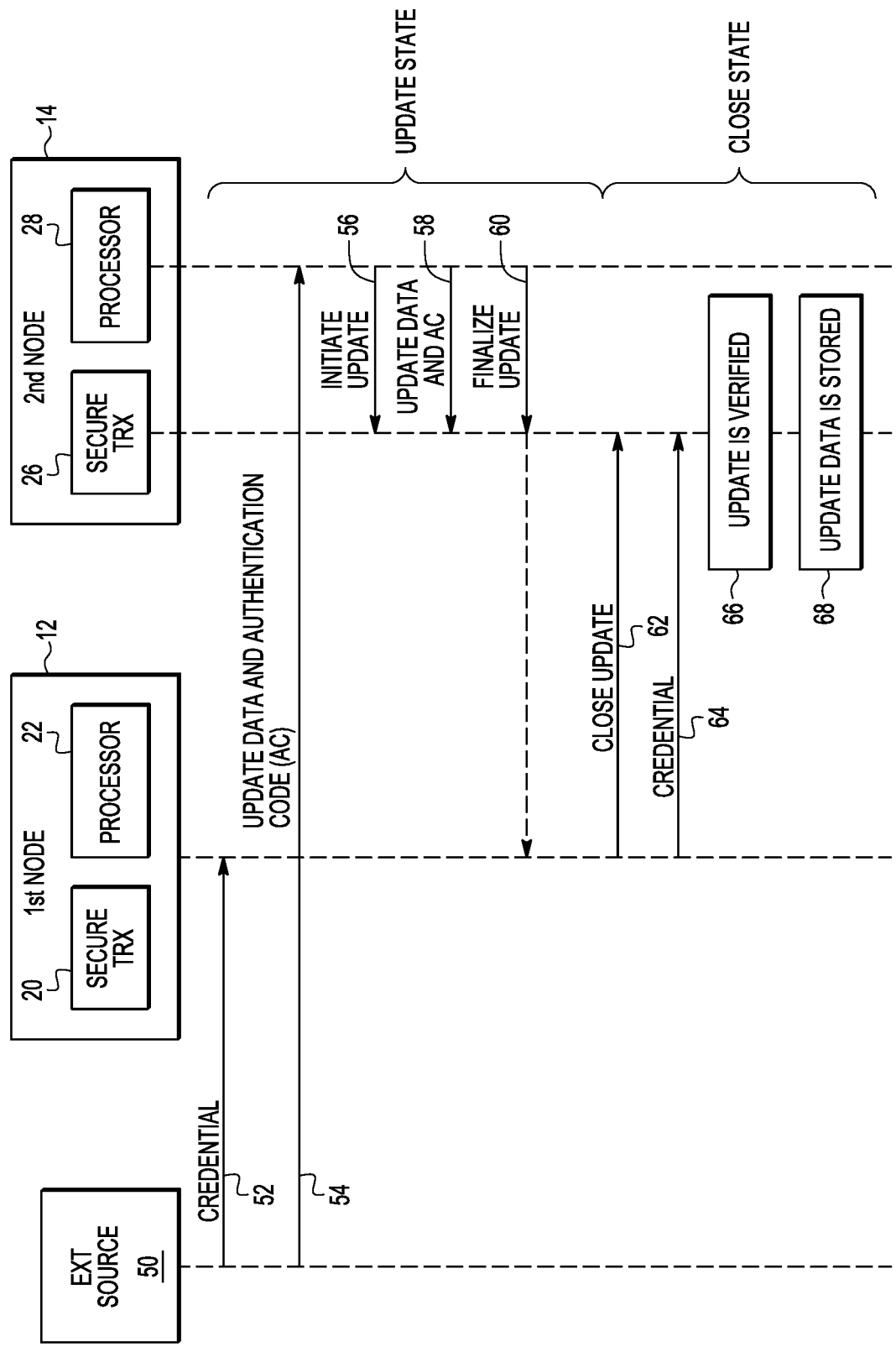
FIG. 4 illustrates a sequence diagram of an authenticated update in accordance with an embodiment.

FIG. 4 illustrates a sequence diagram of an authenticated update in accordance with an embodiment. The example illustrated in FIG. 4 continues the example described above regarding FIG. 1, where the rules set of secure transceiver 26 of node 14 is being updated and node 12 is assigned to be the trusted and privileged node. Portions of nodes 12 and 14 useful for describing the example are illustrated in FIG. 4. Processor 28 of node 14 may be compromised and cannot be trusted to perform the update of transceiver 26. Trusted node 12 is assigned to partially protect and support the rules set update of node 14. The update is provided to system 10 by external source 50, for example, a device of an automotive OEM. A first step (UPDATE state) begins the update. At transmission 52, a credential, which may be a password, is transmitted to trusted node 12 by external source 50. Update data and an authentication code are provided to processor 28 of node 14, the node and transceiver being updated, by external source 50 at transmission 54. Note that communications with processor 28 or 22 may be via secure transceiver 26 or 20, respectively, as illustrated in FIG. 1. The update of the rules set is initiated in secure transceiver 26 by processor 28 in command 56 to secure transceiver 26 which enters UPDATE state. The update data and the authentication code are provided by processor 28 to secure transceiver 26 in communication 58. A command 60 is then issued by processor 28 to secure transceiver 26 to finalize the update. Transceiver 26 finalizes the UPDATE state. Note that the solid lines in FIG. 4 represent a CAN message with a destination. The dashed continuation of the solid arrow command 60 represents a further CAN broadcast of the command on bus 18 relevant to the description. Node 12 also receives the command 60 that was broadcast to finalize the update and in response, processor 22 sends a message protected by transceiver 20 that closes the UPDATE state. A communication 62 CLOSE UPDATE closes the UPDATE state and begins the CLOSE state to authenticate and verify the update. The operating state of secure transceiver 26 moves to the CLOSE state. The rules set can no longer be updated or modified in the CLOSE state. A credential is sent by communication 64 from processor 22 to secure transceiver 26. Alternately, the credential may also be sent as part of the CLOSE UPDATE command 62. The update is verified by secure transceiver 26 at step 66 using the credential received from processor 22 and the authentication code from processor 28. Processor 28 does not know the credential during the UPDATE state and cannot modify the data or the authentication code during the CLOSE state. The authenticated rules set data can then be stored in permanent memory in secure transceiver 26 as shown at step 68.

The embodiments described herein are applicable to both Standard and Extended CAN message formats. Bus access in CAN is event driven and takes place randomly. If two nodes try to occupy serial bus 18 simultaneously, access is implemented with a non-destructive, bit-wise arbitration. In this context, 'non-destructive' encompasses a scenario whereby the node winning arbitration just continues on with the message, without the message being destroyed or corrupted by another node. In some examples, the allocation of priority to messages may be contained in the identifier.

Various embodiments, or portions of the embodiments, may be implemented in hardware or as instructions on a non-transitory machine-readable storage medium including any mechanism for storing information in a form readable by a machine, such as a personal computer, laptop computer, file server, smart phone, or other computing device. The non-transitory machine-readable storage medium may include volatile and non-volatile memories such as read only memory (ROM), random access memory (RAM), magnetic disk storage media, optical storage medium, flash memory, and the like. The non-transitory machine-readable storage medium excludes transitory signals.

Although the invention is described herein with reference to specific embodiments, various modifications and changes can be made without departing from the scope of the present invention as set forth in the claims below. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

What is claimed is:

1. A method for providing an authenticated update in a distributed network having a plurality of nodes coupled to a serial bus, the method comprising:
   transmitting a credential from an external source to a first node;
   providing an updated set of rules and an authentication code to a second node from the external source, wherein the authenticated update is for a transceiver of the second node;
   initiating the authenticated update by a processor of the second node;
   finalizing the authenticated update by the processor of the second node;
   closing the authenticated update by the first node;
   providing, by the first node, the credential of the authenticated update to the second node;
   verifying, by the transceiver of the second node, the update data using the credential and the authentication code; and
   storing the authenticated update data.

2. The method of claim 1, wherein the transceiver of the first node is characterized as being a secure transceiver capable of invalidating messages on the serial bus according to predetermined rules.

3. The method of claim 1, wherein verifying further comprises using a cyclic redundancy check over a scrambled version of the update data and the authentication code according to a scramble mask defined by the credential.

4. The method of claim 1, wherein initiating the authenticated update further comprises the transceiver of the second node entering an update state wherein the transceiver of the second node accepts commands to update data in a memory of the transceiver of the second node and rejects commands to set the credential.

5. The method of claim 1, wherein finalizing the authenticated update further comprises the transceiver of the second node entering a close state wherein the transceiver of the second node does not accept commands to update data in a memory of the second node.

6. The method of claim 1, wherein the distributed network is a controller area network (CAN).

7. The method of claim 1, wherein the authentication code is characterized as being a message authentication code (MAC).

8. The method of claim 1, wherein the credential is randomly generated for each authenticated update in the distributed network.

9. A method for providing an authenticated update in a controller area network (CAN) having a plurality of nodes coupled to a serial bus, the method comprising:
    transmitting a credential from an external device to the first node;
    providing update data and an authentication code to a processor of a second node from the external device;
    initiating the authenticated update by the processor of the second node;
    providing, by the processor of the second node, the update data and the authentication code to a secure transceiver of the second node;
    finalizing the authenticated update by the processor of the second node;
    closing the authenticated update by the first node;
    providing, by a transceiver of the first node, the credential of the authenticated update to the secure transceiver of the second node, wherein the transceiver of the first node is configured to monitor and invalidate messages on the serial bus according to predetermined rules;
    verifying, by the secure transceiver of the second node, the update data using the credential and the authentication code; and
    storing the authenticated update data in a memory.

10. The method of claim 9, wherein verifying further comprises using a cyclic redundancy check over a scrambled version of the update data and the authentication code according to a scramble mask defined by the credential.

11. The method of claim 9, wherein the credential is a password.

12. The method of claim 9, wherein the authenticated update is an update of a set of rules for the secure transceiver of the distributed network.

13. The method of claim 9, wherein initiating the authenticated update further comprises the secure transceiver of the second node entering an update state wherein the secure transceiver of the second node accepts commands to update data in a memory of the transceiver of the second node and rejects commands to set the credential.

14. The method of claim 9, wherein finalizing the authenticated update further comprises the secure transceiver of the second node entering a close state wherein the secure transceiver of the second node does not accept commands to update data in a memory of the second node.

15. A method for providing an authenticated update in a controller area network (CAN) having a plurality of nodes coupled to a serial bus, the method comprising:
    transmitting a credential from an external device to a secure transceiver of the first node;
    providing update data and an authentication code to a processor of a second node from the external device;
    initiating the authenticated update by the processor of the second node;
    entering an update state;
    providing, by the processor of the second node, the update data and the authentication code to the secure transceiver of the second node;
    finalizing the authenticated update by the processor of the second node;
    entering a close state;
    closing the authenticated update by the secure transceiver of the first node;
    providing, by the transceiver of the first node, the credential of the authenticated update to the secure transceiver of the second node;
    verifying, by the secure transceiver of the second node, the update data using the credential and the authentication code; and
    storing the authenticated update data in a memory.

16. The method of claim 15, wherein the authentication code is characterized as being a message authentication code (MAC).

17. The method of claim 15, wherein the secure transceiver is characterized as being capable of removing messages on the serial bus according to predetermined rules.

18. The method of claim 17, wherein the authenticated update is an update of the predetermined rules.

* * * * *